United States Patent
Kim

(10) Patent No.: US 11,827,196 B2
(45) Date of Patent: Nov. 28, 2023

(54) APPARATUS FOR VEHICLE BRAKING

(71) Applicant: HYUNDAI MOBIS CO., LTD., Seoul (KR)

(72) Inventor: Jong Sung Kim, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 358 days.

(21) Appl. No.: 17/382,857

(22) Filed: Jul. 22, 2021

(65) Prior Publication Data

US 2022/0024427 A1 Jan. 27, 2022

(30) Foreign Application Priority Data

Jul. 23, 2020 (KR) .................. 10-2020-0091497

(51) Int. Cl.
*B60T 8/17* (2006.01)
*B60T 13/74* (2006.01)

(52) U.S. Cl.
CPC .............. *B60T 8/17* (2013.01); *B60T 13/74* (2013.01)

(58) Field of Classification Search
CPC ... B60T 8/00; B60T 8/17; B60T 13/74; B60T 13/746
See application file for complete search history.

(56) References Cited

U.S. PATENT DOCUMENTS

| | | | |
|---|---|---|---|
| 2006/0091728 A1* | 5/2006 | Fulks | B60T 7/22 303/193 |
| 2010/0007199 A1* | 1/2010 | Kim | B60T 13/741 303/3 |
| 2010/0030444 A1* | 2/2010 | Roll | B60T 8/267 701/80 |
| 2010/0198475 A1* | 8/2010 | Stolzl | B60W 30/18127 303/3 |
| 2011/0168502 A1* | 7/2011 | Linhoff | B60T 13/746 303/3 |
| 2019/0248354 A1* | 8/2019 | Andrea | B60T 13/741 |

* cited by examiner

*Primary Examiner* — John Kwon
(74) *Attorney, Agent, or Firm* — Morgan, Lewis & Bockius LLP

(57) ABSTRACT

The present disclosure in at least one embodiment provides an apparatus for braking a vehicle, including at least one sensor for detecting a braking input of the vehicle, a front-wheel EMB including a front-wheel motor and a front-wheel brake for braking a front wheel(s), a rear-wheel EMB including a rear-wheel motor and a rear-wheel brake for braking a rear wheel(s), a front-wheel ECU for controlling the front-wheel motor for allowing the front-wheel EMB to brake the front wheel, a center ECU for calculating and transmitting, upon receiving the braking input from the at least one sensor, a braking force to the front-wheel ECU, and controlling the rear-wheel motor for allowing the rear-wheel EMB to brake the rear wheel, and a battery for supplying electric power to the front-wheel ECU and the center ECU, wherein the front-wheel EMB is controlled by the front-wheel ECU, and the rear-wheel EMB is controlled by the center ECU.

12 Claims, 3 Drawing Sheets

APPARATUS FOR VEHICLE BRAKING

CROSS-REFERENCE TO RELATED APPLICATIONS

This application is based on, and claims priority from, Korean Patent Application Number 10-2020-0091497, filed Jul. 23, 2020, the disclosure of which is incorporated by reference herein in its entirety.

TECHNICAL FIELD

The present disclosure in some embodiments relates to an apparatus for vehicle braking.

BACKGROUND

The statements in this section merely provide background information related to the present disclosure and do not necessarily constitute prior art.

An electromechanical brake (EMB) has been developed and is in widespread use. The electromechanical brake was developed as an electronic parking brake (EPB), but recently, its use area has been expanded to work as a main brake replacing the conventional hydraulic brake. The electromechanical brake has a brake caliper installed with a motor-driven actuator to use the motor drive for braking the relevant vehicle directly without a medium called brake fluid. The electromechanical brake has a mechanism similar to that of the EPB, except that the electromechanical brake is mainly used for main braking and requires a higher braking response and operational durability than EPB. Additionally, the electromechanical brake has a simpler structure than a hydraulic brake, has a superior braking response speed, and enables more precise control, thereby improving braking stability.

FIG. 3 is a block diagram showing a conventional braking apparatus.

As shown in FIG. 3, the conventional braking apparatus 300 includes all or some of a sensor unit 110, a center electronic control unit (center ECU) 310, front-wheel ECUs 320, 330, rear-wheel ECUs 340, 350, drive units 140, a plurality of wheel brakes 150, and a plurality of batteries 162, 164.

The conventional braking apparatus 300 will be described around differences from the present disclosure in one embodiment as illustrated by a vehicle braking apparatus 100 and in another embodiment as illustrated by another vehicle braking apparatus 200.

The conventional braking apparatus 300 includes additional ECUs to the center ECU, which are the front-wheel ECUs 320, 330, and the rear-wheel ECUs 340, 350.

The front-wheel ECUs 320, 330 utilize the center ECU 310 and in-vehicle communications to control front-wheel electromechanical brakes installed, and the rear-wheel ECUs 340, 350 utilize the center ECU 310 and in-vehicle communications to control rear-wheel electromechanical brakes installed.

The conventional braking apparatus 300 uses BLDC motors, for each of the electromechanical brakes of the front wheels and rear wheels, which would be more costly than a hitherto braking apparatus that could perform as well with inexpensive direct current (DC) motors replacing some of the BLDC motors, especially in the rear-wheel electromechanical brakes. This prior art inability to use DC motors adds to the manufacturing cost of the electromechanical brakes.

Additionally, the conventional braking apparatus 300 requires the wheel ECUs 320, 330, 340, and 350 on both the front wheels and rear wheels, resulting in bulky braking apparatuses. Therefore, a need exists for a practical technology to address and minimize the costs in terms of money and loss of footprint space of vehicle braking apparatuses.

SUMMARY

According to at least one embodiment, the present disclosure provides an apparatus for braking a vehicle, including at least one sensor, a front-wheel electromechanical brake (front-wheel EMB), a rear-wheel EMB, a front-wheel electronic control unit (front-wheel ECU), a center ECU, and a battery. The at least one sensor is configured to detect a braking input of the vehicle. The front-wheel EMB includes a front-wheel motor and a front-wheel brake configured to brake a front wheel of one or more front wheels. The rear-wheel EMB includes a rear-wheel motor and a rear-wheel brake configured to brake a rear wheel of one or more rear wheels. The front-wheel ECU is configured to control the front-wheel motor for allowing the front-wheel EMB to brake the front wheel. The center ECU is configured to calculate and transmit, upon receiving the braking input from the at least one sensor, a braking force to the front-wheel ECU, and to control the rear-wheel motor for allowing the rear-wheel EMB to brake the rear wheel. The battery is configured to supply electric power to the front-wheel ECU and the center ECU. Here, the front-wheel EMB is controlled by the front-wheel ECU, and the rear-wheel EMB is controlled by the center ECU.

REFERENCE NUMERALS

Figure 1:
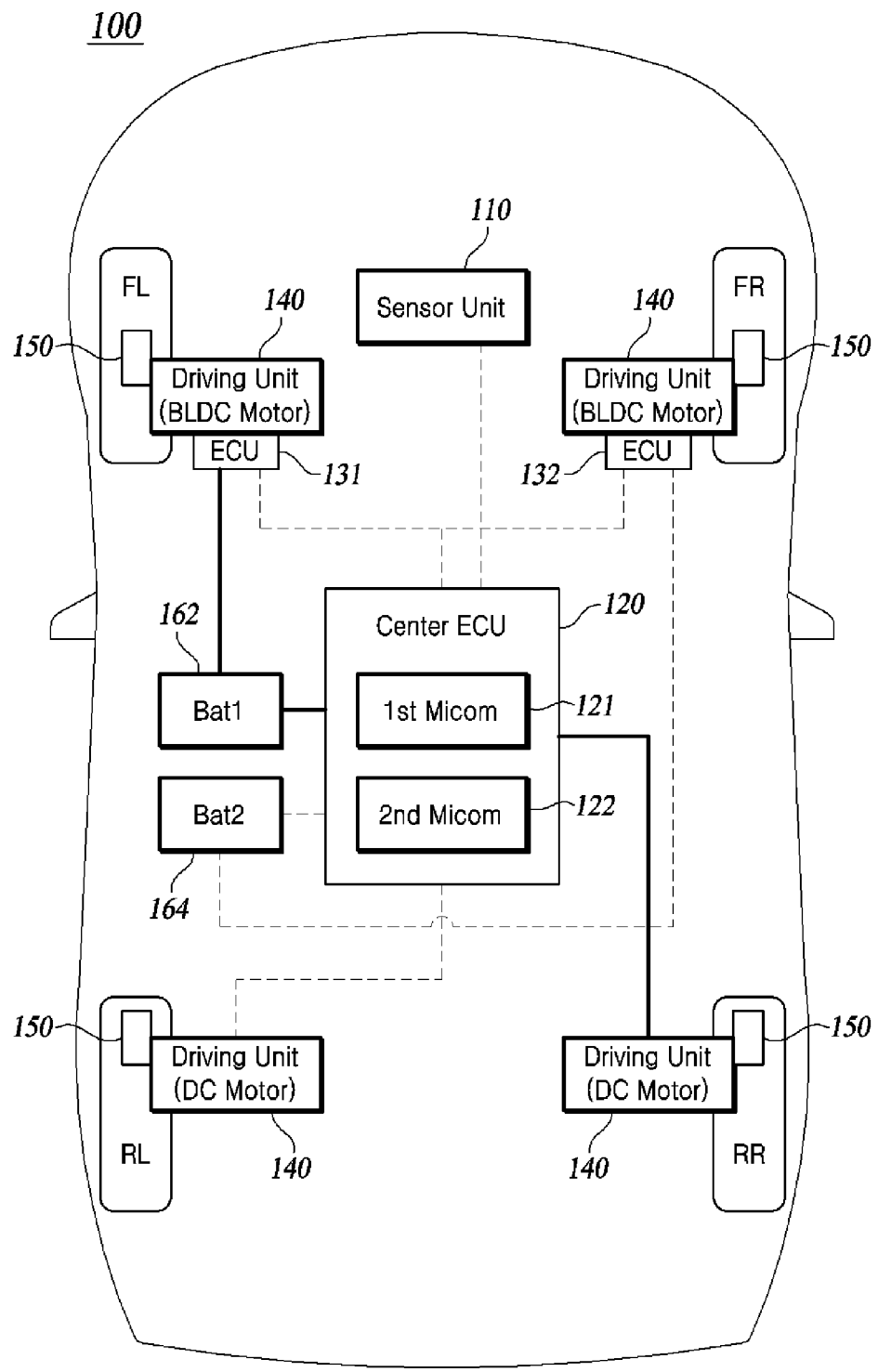
FIG. 1 is a block diagram of a vehicle braking apparatus according to at least one embodiment of the present disclosure.

110: sensor unit 120: center ECU
131, 132: front-wheel ECU 140: drive unit
150: wheel brake 160: battery

DETAILED DESCRIPTION

The present disclosure in at least one embodiment seeks to employ DC motors in place of BLDC motors for use in the rear-wheel electromechanical brakes (EMBs) to achieve the manufacturing cost reduction with the EMBs.

Additionally, the present disclosure seeks to consolidate rear-wheel ECUs into the center ECU taking advantage of the replacement of BLDC motors with the DC motors. By removing the need to provide the rear-wheel EMBs with separate rear-wheel ECUs, the present disclosure seeks to minimize the EMBs to take up significantly less space.

Some embodiments of the present disclosure are described below with reference to the accompanying drawings. In the following description, like reference numerals preferably designate like elements, although the elements are shown in different drawings. Further, in the following description of some embodiments, a detailed description of known functions and configurations incorporated herein will be omitted for the purpose of clarity and for brevity.

Additionally, alphanumeric codes such as first, second, i), ii), a), b), etc., in numbering components are used solely for the purpose of differentiating one component from the other but not to imply or suggest the substances, the order, or sequence of the components. Throughout this specification, when parts "include" or "comprise" a component, they are meant to further include other components, not excluding thereof unless there is a particular description contrary thereto.

FIG. 1 is a block diagram of a vehicle braking apparatus according to at least one embodiment of the present disclosure.

As shown in FIG. 1, the vehicle braking apparatus 100 according to at least one embodiment of the present disclosure includes all or some of a sensor unit 110, a center ECU 120, front-wheel ECUs 131, 132, drive units 140, a plurality of wheel brakes 150, and a plurality of batteries 162, 164.

The sensor unit 110 includes all or some of a stroke sensor, a wheel speed sensor, and an acceleration sensor.

The wheel speed sensor detects the wheel speed of the vehicle wheels, the acceleration sensor detects the acceleration of the vehicle, and the stroke sensor detects the depression amount or stroke of a brake pedal.

The sensor unit 110 transmits information detected by the respective sensors to the center ECU 120.

The center ECU 120 includes a first microcomputer 121 and a second microcomputer 122.

The first microcomputer 121 determines whether braking is required for the vehicle. Whether the vehicle needs braking is determined based on various factors, for example, a stroke of the brake pedal.

Upon determining that a braking input is required, the first microcomputer 121 calculates the braking force required to brake the vehicle. The first microcomputer 121 controls the driving units 140 to generate the calculated braking force by the plurality of wheel brakes 150.

The center ECU 120 receives power from a plurality of batteries. In particular, the first microcomputer 121 receives electric power from the first battery 162 and the second microcomputer 122 receives electric power from the second battery 164.

The center ECU 120 controls the EMBs mounted on the front and rear wheels to generate braking force. More specifically, to generate a braking force by the EMB mounted on the front left wheel, the first microcomputer 121 transmits an electric signal to the front left-wheel ECU 131 which then activates the EMB to finally supply the braking power to the front left wheel. Here, the transmission of the electrical signal may be performed by in-vehicle communications, for example, controller area network (CAN) communications. Additionally, the first microcomputer 121 enables an EMB mounted on a rear right wheel to generate a braking force by supplying an electric current to a motor mounted on the rear right wheel.

In the vehicle braking apparatus 100 according to at least one embodiment, the front wheels are installed with the front-wheel ECUs 131 and 132 for supplying electric current to the motors installed in the respective front wheels and thereby supplying the braking force to the front wheels, while the rear wheels have no separate rear-wheel ECUs installed and, instead, the center ECU 120 supplies electric current to the motors installed in the respective rear wheels and thereby supply braking force to the rear wheels.

The second microcomputer 122 will be described around its distinctive features compared to the first microcomputer 121.

The second microcomputer 122 receives electric power from the second battery 164.

The steps performed by the second microcomputer 122, including whether the vehicle needs braking, calculating the braking force, and controlling the driving unit 140, follow the same algorithm performed by the first microcomputer 121. However, the second microcomputer 122 brakes the front right wheel and the rear left wheel, which is different from the first microcomputer 121 that brakes the front left wheel and the rear right wheel.

More specifically, to generate a braking force by the EMB mounted on the front right wheel, the second microcomputer 122 transmits an electric signal to the front right-wheel ECU 132 which then activates the front-right EMB to finally supply the braking power to the front right wheel. Additionally, the second microcomputer 122 enables an EMB mounted on a rear left wheel to generate a braking force by supplying an electric current to a motor mounted on the rear left wheel.

The front-wheel ECUs 131, 132 include a front left-wheel ECU (FL ECU) 131 and a front right-wheel ECU (FR ECU) 132.

The front-wheel ECUs 131 and 132 are each mounted on a gearbox or a motor. More specifically, the front left-wheel ECU 131 is mounted on a motor or gearbox provided on the front left-wheel brake, and the front right-wheel ECU 132 is mounted on a motor or gearbox provided on the front right-wheel brake.

The front-wheel ECUs 131, 132 receive power from a plurality of batteries 162 and 164. In particular, the front left-wheel ECU 131 receives electric power from the first battery 162, and the front right-wheel ECU 132 receives electric power from the second battery 164.

The front-wheel ECUs 131, 132 are each reasonably supplied with electric power from each of the batteries 162, 164 to ensure redundancy in case of malfunction of any one of the batteries 162, 164, for example, the first battery 162. In particular, even when a failure occurs in the first battery 162 and the front left-wheel ECU 131 is inoperable, the front right-wheel ECU 132 is still powered by the second battery 164 to generate and provide braking force to the front right wheel and thereby brake the vehicle.

The drive unit 140 includes a motor, a gearbox, a piston, a brake pad, a caliper housing, and a caliper body, although these components are not shown.

The present disclosure includes drive units 140 that are composed of front-wheel drive units for generating braking force to the front wheels and rear-wheel drive units for generating braking force to the rear wheels. Bearing in mind that in the vehicle braking apparatus 100 according to at least one embodiment the front-wheel drive units differ from the rear-wheel drive unit only by the type of their relevant motors with other components configured to be analogous, a general description will be provided on a single driving unit 140.

The motor generates driving power by rotating in a forward or reverse direction depending on the current flow. Here, the driving power means the rotational force of the motor. The rotational force of the motor is transmitted to a screw (not shown) of the gearbox to form a braking force.

In the detailed description of the present disclosure, motors mounted on the front left and right wheels are referred to as front-wheel motors, and motors mounted on the rear right and left wheels are referred to as rear-wheel motors.

The motor of the present disclosure includes both a BLDC motor and a DC motor. More specifically, the front EMBs are equipped with BLDC motors, and the rear EMBs are equipped with DC motors.

The gearbox includes a plurality of gears and screws for making a linear motion of the spindle (not shown) by the rotational force of the motor. When the spindle of the gearbox makes a linear motion, the piston attached to a caliper body at one end thereof moves forward or backward, and accordingly, a brake pad connected to the piston depresses the disc (not shown) to establish the braking force.

In the present disclosure, since a typical configuration related to the drive of the gearbox is obvious to a person skilled in the art, illustration, and description thereof will be omitted.

The electromechanical brake (EMB) described in the present disclosure was developed as an electric parking brake (EPB), but recently, its use area is expanding to work as a main brake for replacing the conventional hydraulic brake.

In general, the EMB has a parking function integrated, but the vehicle braking apparatus 100 according to at least one embodiment includes both the main brake without a parking function and the main brake with a parking function.

A plurality of wheel brakes 150 includes a first wheel brake FL installed on the front left wheel, a second wheel brake FR installed on the front right wheel, a third wheel brake RL installed on the rear left wheel, and a fourth wheel brake RR installed on the rear right wheel.

In the detailed description of the present disclosure, the front-wheel brakes refer to a first wheel brake FL and a second wheel brake FR, and the rear-wheel brakes refer to a third wheel brake RL and a fourth wheel brake RR.

The plurality of wheels includes a front left wheel, a front right wheel, a rear left wheel, and a rear right wheel. A plurality of wheels are installed to be rotatable on a vehicle body, and the wheels are supplied with a braking force from the plurality of wheel brakes 150.

The plurality of batteries 162 and 164 includes the first battery 162 and the second battery 164.

The first battery 162 electrically powers the center ECU 120 and the front left-wheel ECU 131, and the second battery 164 powers the center ECU 120 and the front right-wheel ECU 132. In particular, supplying the power may be achieved by the first battery 162 supplying an electric current to the center ECU 120 wherein the first microcomputer 121 controls the front left-wheel ECU 131 to cause the first wheel brake FL to generate the braking force. Additionally, the first microcomputer 121 controls the motor mounted on the rear right wheel to supply braking force to the relevant wheel brake.

On the other hand, the second battery 164 supplies electric current to the center ECU 120 wherein the second microcomputer 122 controls the front right-wheel ECU 132 to cause second wheel brake FR to generate the braking force. Additionally, the second microcomputer 122 controls the motor mounted on the rear left wheel to supply braking force to the relevant wheel brake.

The vehicle braking apparatus 100 according to at least one embodiment employs a DC motor in place of a BLDC motor for use with the driving unit 140 mounted on the rear-wheel EMB. The conventional structure that employs the BLDC motors with the rear-wheel EMBs works on the premise that the rear-wheel ECUs 340, 350 remain unchanged far from that these ECUs would be better obviated. In particular, wiring of the BLDC motors to a remote ECU, for example, the center ECU 120 may take a risk of generating electromagnetic interference. Here, electromagnetic interference refers to a design problem such as interference that follows the three-phase current when wired between the BLDC motor and the center ECU 120. To solve the electromagnetic interference of the BLDC motor, a shielded wire cable needs to be used. The shielded wire cable is expensive and undesirably increases the manufacturing cost of EMB.

However, if a DC motor could be used for the rear-wheel EMB, electromagnetic interference will be precluded, which allows to advantageously use an ordinary harness for linking the DC motor with a remote ECU, for example, the center ECU 120.

The present disclosure in some embodiment employs such DC motors for the rear-wheel EMBs, thereby reducing the manufacturing cost of the EMB.

Figure 3:
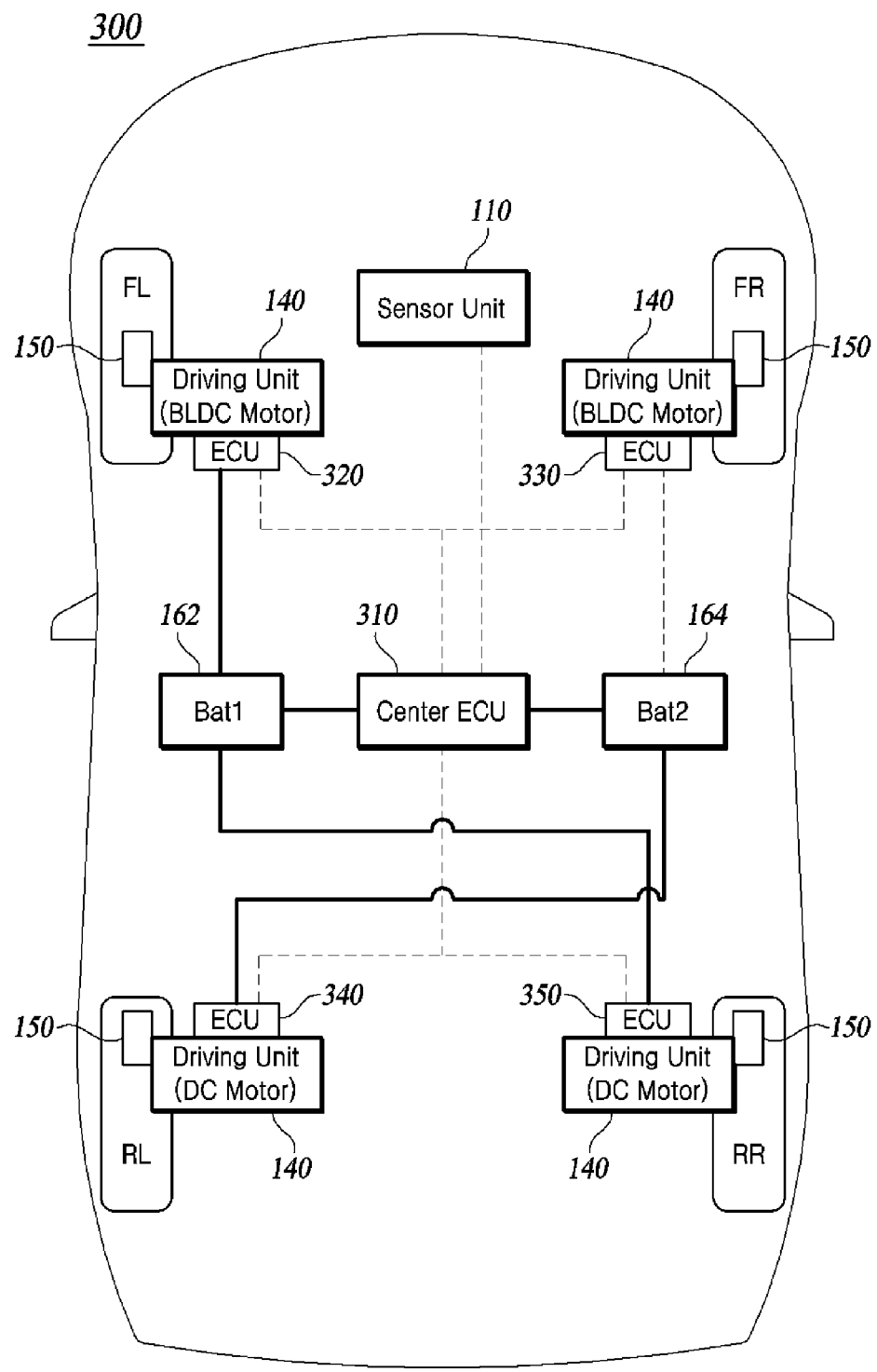
FIG. 3 is a block diagram showing a conventional braking apparatus.

Employing the DC motors brings the added benefit of eliminating electromagnetic interference, which obviates the need to install the rear-wheel ECUs 340, 350 dedicated for the rear-wheel EMBs as in the prior art example. Instead, the rear-wheel ECUs 340, 350 may be integrated into the central controller 120. Accordingly, in the vehicle braking apparatus 100 according to at least one embodiment, the first microcomputer 121 and the second microcomputer 122 function in place of the rear right-wheel (RR) ECU 350 and the rear left-wheel (RL) ECU 340 of FIG. 3, respectively. In short, the vehicle braking apparatus 100 no more includes the rear left-wheel ECU 340 and the rear right-wheel ECU 350. By excluding the rear-wheel ECUs 340, 350, the rear-wheel EMBs can be reduced in size.

Figure 2:
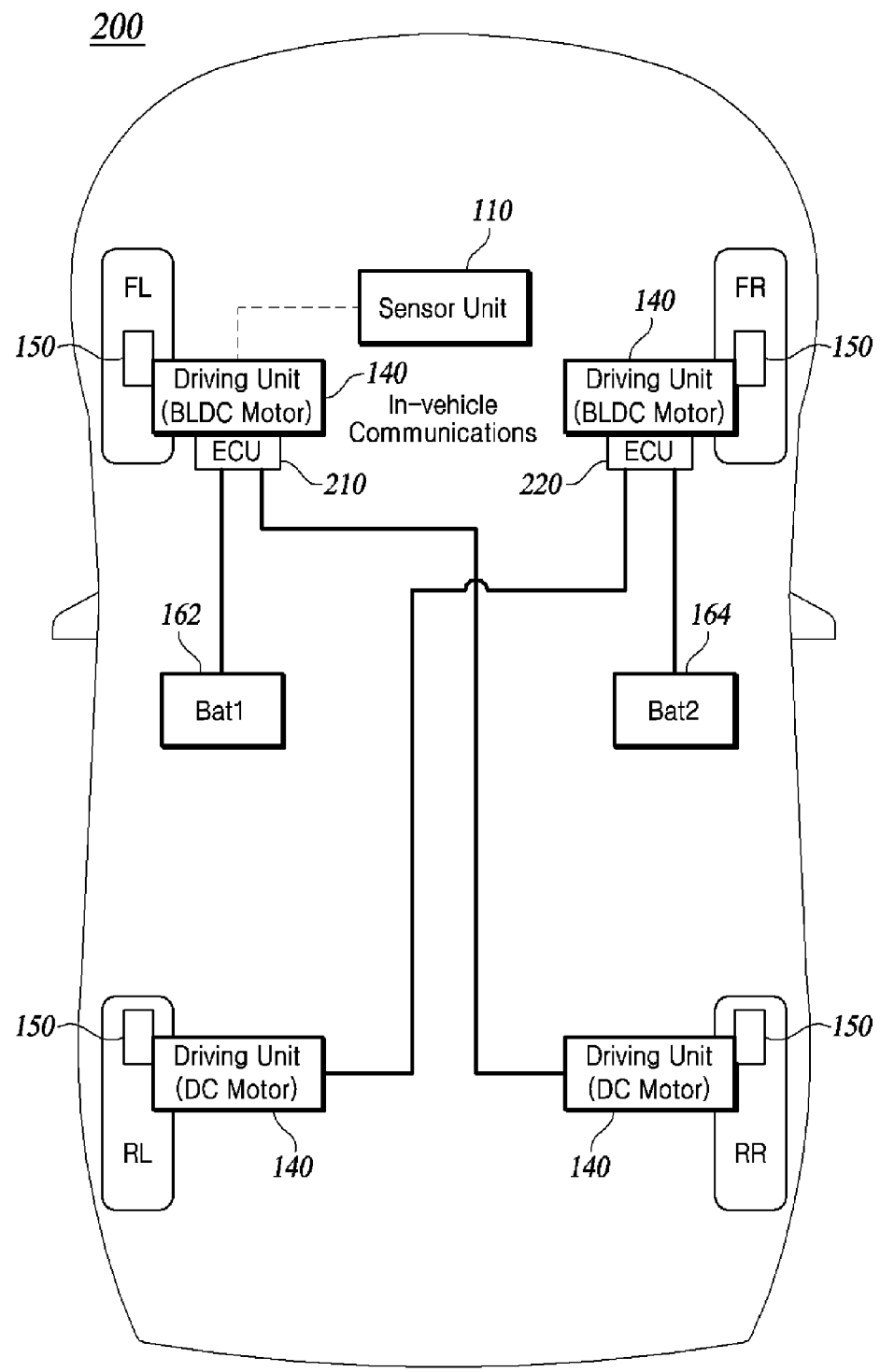
FIG. 2 is a block diagram of a vehicle braking apparatus according to another embodiment of the present disclosure.

FIG. 2 is a block diagram of a vehicle braking apparatus 200 according to another embodiment of the present disclosure.

The vehicle braking apparatus 200 according to another embodiment of the present disclosure will be described about its distinctive features from the vehicle braking apparatus 100.

As shown in FIG. 2, the vehicle braking apparatus 200 according to another embodiment includes all or some of a sensor unit 110, front-wheel ECUs 210, 220, drive units 140, a plurality of wheel brakes 150, and a plurality of batteries 162, 164.

The vehicle braking apparatus 200 incorporates the center ECU 120 of the vehicle braking apparatus 100 and the rear-wheel ECUs 340, 350 (FIG. 3) into the front-wheel ECUs 210, 220. In particular, the first microcomputer 121 of the vehicle braking apparatus 100 and the rear right-wheel ECU 350 (FIG. 3) are integrated into the front left-wheel ECU 210, and the second microcomputer 122 of the vehicle braking apparatus 100 and the rear left-wheel ECU 340 (FIG. 3) are integrated into the front right-wheel ECU 220.

The vehicle braking apparatus 100 of FIG. 1 incorporates the rear-wheel ECUs 340, 350 into the center ECU 120, whereas the vehicle braking apparatus 200 of FIG. 2 incorporates the rear-wheel ECUs 340, 350 and the center ECU 120 into the front-wheel ECUs 210, 220. So, the vehicle braking apparatus 200 according to another embodiment include no separate center ECU 120.

In the vehicle braking apparatus 200, the front left-wheel ECU 210 works as a main ECU for braking the vehicle, and the front right-wheel ECU 220 works as a sub-ECU for braking the vehicle. In particular, when the sensor unit 110 detects a braking input, for example, a drivers brake pedal stroke, it transmits the detected signal to the main ECU. The main ECU transmits the received signal to the sub-ECU via in-vehicle communications. Here, the in-vehicle communications may be, for example, CAN communications.

The main ECU and the sub-ECU, upon receiving the braking input of the vehicle, calculate braking force and control the EMBs mounted on the front and rear wheels to generate braking force. More specifically, the main ECU, e.g., the front left-wheel ECU 210 supplies electric current to the motors mounted on the front left wheel and the rear right wheel, and the sub-ECU, e.g., the front right-wheel ECU 220 supplies electric current to the motors mounted on the front right wheel and the rear left wheel, thereby regulating the braking force to stop the vehicle.

The electric current is supplied to the motors mounted on the rear wheels by using wiring as described in FIG. 1. When wiring, the vehicle braking apparatus 200 utilizes DC motors for the rear-wheel motors, precluding electromagnetic interference from occurring, which is contrary to the conventional vehicle braking apparatus providing rear-wheel BLDC motors with three-phase current wiring that involves electromagnetic interference as detailed in the description of FIG. 1.

The vehicle braking apparatus 200 also utilizes DC motors in place of conventional BLDC motors for the rear-wheel EMBs and thereby reduces the manufacturing cost of the EMB. Moreover, no electromagnetic interference occurs even with the rear-wheel ECUs 340, 350 detached from the rear-wheel EMBs and integrated into the front-wheel ECUs 210, 220, resulting in miniaturized rear-wheel EMBs.

As described above, the present disclosure in some embodiments can reduce the manufacturing cost of the electromechanical brakes by utilizing the DC motors in place of BLDC motors of the rear-wheel electromechanical brakes.

Further, the present disclosure offers miniatured rear-wheel electromechanical brakes involving no more rear-wheel ECUs.

Although embodiments of the present disclosure have been described for illustrative purposes, those skilled in the art will appreciate that various modifications, additions, and substitutions are possible, without departing from the idea and scope of the claimed invention. Therefore, embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. An apparatus for braking a vehicle, comprising:
   at least one sensor configured to detect a braking input of the vehicle;
   a front-wheel electromechanical brake (front-wheel EMB) including a front-wheel motor and a front-wheel brake configured to brake a front wheel of one or more front wheels;
   a rear-wheel EMB including a rear-wheel motor and a rear-wheel brake configured to brake a rear wheel of one or more rear wheels;
   a front-wheel electronic control unit (front-wheel ECU) configured to control the front-wheel motor for allowing the front-wheel EMB to brake the front wheel;
   a center ECU configured to calculate and transmit, upon receiving the braking input from the at least one sensor, a braking force to the front-wheel ECU, and to control the rear-wheel motor for allowing the rear-wheel EMB to brake the rear wheel; and
   a battery configured to supply electric power to the front-wheel ECU and the center ECU,
   wherein the front-wheel EMB is controlled by the front-wheel ECU, and the rear-wheel EMB is controlled by the center ECU.

2. The apparatus of claim 1, wherein the rear-wheel motor comprises a DC motor.

3. The apparatus of claim 1, wherein the center ECU comprises
   a first microcomputer and a second microcomputer,
   wherein the first microcomputer is configured to deliver the braking force to a front left-wheel ECU mounted on a front left wheel among the one or more front wheels, and
   the second microcomputer is configured to deliver the braking force to a front right-wheel ECU mounted on a front right wheel among the one or more front wheels.

4. The apparatus of claim 3, wherein the rear-wheel motor comprises
   a rear right-wheel motor and a rear left-wheel motor,
   wherein the first microcomputer is configured to control the battery to supply an electric current to the rear right-wheel motor, and
   the second microcomputer is configured to control the battery to supply an electric current to the rear left-wheel motor.

5. The apparatus of claim 1, wherein the center ECU comprises
   a first microcomputer and a second microcomputer,
   wherein the first microcomputer is configured to deliver the braking force to a front right-wheel ECU mounted on a front right wheel among the one or more front wheels, and
   the second microcomputer is configured to deliver the braking force to a front left-wheel ECU mounted on a front left wheel among the one or more front wheels.

6. The apparatus of claim 5, wherein the rear-wheel motor comprises
   a rear right-wheel motor and a rear left-wheel motor, and
   wherein the first microcomputer is configured to control the battery to supply an electric current to the rear left-wheel motor, and
   the second microcomputer is configured to control the battery to supply an electric current to the rear right-wheel motor.

7. The apparatus of claim 3, wherein the battery comprises
   a first battery and a second battery,
   wherein the first battery is configured to supply electric power to the first microcomputer, and the second battery is configured to supply electric power to the second microcomputer.

8. The apparatus of claim 4, wherein the battery comprises:
   a first battery and a second battery,
   wherein the first battery is configured to supply electric power to the first microcomputer, and the second battery is configured to supply electric power to the second microcomputer.

9. An apparatus for braking a vehicle, comprising:
   at least one sensor configured to detect a braking input of the vehicle;
   a front-wheel electromechanical brake (front-wheel EMB) including a front-wheel motor and a front-wheel brake configured to brake a front wheel of one or more front wheels;

a rear-wheel EMB including a rear-wheel motor and a rear-wheel brake configured to brake a rear wheel of one or more rear wheels;

a front-wheel electronic control unit (front-wheel ECU) configured to control the front-wheel motor for allowing the front-wheel EMB to brake the front wheel; and a battery configured to supply electric power to the front-wheel ECU, wherein the front-wheel ECU is configured to calculate, upon receiving the braking input from the at least one sensor, a braking force, and to control the front-wheel EMB to brake the front wheel, and the front-wheel ECU is configured to control the rear-wheel EMB to brake the rear wheel.

10. The apparatus of claim 9, wherein the rear-wheel motor comprises a DC motor.

11. The apparatus of claim 9, wherein the front-wheel ECU comprises a front left-wheel ECU and a front right-wheel ECU, and wherein the front left-wheel ECU is configured to calculate and transmit, upon receiving the braking input from the at least one sensor, the braking force to the front right-wheel ECU through in-vehicle communications.

12. The apparatus of claim 11, wherein the rear-wheel EMB comprises:

a rear right-wheel EMB and a rear left-wheel EMB, wherein the front left-wheel ECU is configured to control the battery to supply an electric current to a rear right-wheel motor mounted on the rear right-wheel EMB, and the front right-wheel ECU is configured to control the battery to supply an electric current to a rear left-wheel motor mounted on the rear left-wheel EMB.

\* \* \* \* \*